United States Patent
Millington et al.

(10) Patent No.: US 10,970,722 B2
(45) Date of Patent: Apr. 6, 2021

(54) METHOD, SYSTEMS, AND COMPUTER-READABLE STORAGE MEDIA FOR REAL-TIME EVENT MANAGEMENT SYSTEM FOR MOBILE DEVICES

(71) Applicant: BRIGHTSTAR CORP., Miami, FL (US)

(72) Inventors: Mariela Millington, Melbourne (AU); Ranga Rajamanickam, Cumming, GA (US); John Harper, Roswell, GA (US); Clay Bodnarek, Alpharetta, GA (US)

(73) Assignee: Brightstar Corp., Miami, FL (US)

( * ) Notice: Subject to any disclaimer, the term of this patent is extended or adjusted under 35 U.S.C. 154(b) by 180 days.

(21) Appl. No.: 16/186,928

(22) Filed: Nov. 12, 2018

(65) Prior Publication Data

US 2019/0147454 A1 May 16, 2019

Related U.S. Application Data

(60) Provisional application No. 62/585,763, filed on Nov. 14, 2017.

(51) Int. Cl.
| | |
|---|---|
| *G06Q 30/00* | (2012.01) |
| *G06Q 30/06* | (2012.01) |
| *G06Q 10/08* | (2012.01) |
| *H04L 29/08* | (2006.01) |
| *H04W 88/02* | (2009.01) |
| *H04L 29/14* | (2006.01) |

(52) U.S. Cl.
CPC ....... *G06Q 30/012* (2013.01); *G06Q 30/0621* (2013.01); *G06Q 30/0635* (2013.01); *G06Q 30/0641* (2013.01); *G06Q 10/0833* (2013.01); *H04L 67/306* (2013.01); *H04L 69/40* (2013.01); *H04W 88/02* (2013.01)

(58) Field of Classification Search
CPC ... G06Q 30/0601–0645; G06Q 30/012; G06Q 30/016
USPC ................................ 705/26.1–27.2
See application file for complete search history.

(56) References Cited

U.S. PATENT DOCUMENTS

| | | | |
|---|---|---|---|
| 8,644,813 B1 | 2/2014 | Gailloux et al. | |
| 10,129,411 B1* | 11/2018 | Delker | H04M 15/42 |
| 2007/0093243 A1* | 4/2007 | Kapadekar | H04M 3/00 |
| | | | 455/419 |
| 2008/0162316 A1 | 7/2008 | Rampell et al. | |

(Continued)

OTHER PUBLICATIONS

Margaret, and Dibben. "Lost Connection for Phone Trade-in: Question of Money Margaret Dibben." Sunday Times, Jan. 19, 2014, p. 6. ProQuest. Web. Jul. 2, 2020. (Year: 2014).*

(Continued)

*Primary Examiner* — Jeffrey A. Smith
*Assistant Examiner* — Kennedy Gibson-Wynn
(74) *Attorney, Agent, or Firm* — Barnes & Thornburg LLP

(57) ABSTRACT

A computerized system and method of managing events surrounding the lifecycle of used and new mobile devices. The system provides a "360 view" that integrates a mobile device's service options, such as financing and device protection, as well as at the device level regarding potential hardware/software errors. This provides an end-to-end view of consumers, such as claims on device protection plans, repayment issues, utilization of upgrades and/or other information in a user's profile across multiple underlying systems during the device's lifecycle.

35 Claims, 18 Drawing Sheets

(56) References Cited

U.S. PATENT DOCUMENTS

| | | | | |
|---|---|---|---|---|
| 2012/0011020 A1* | 1/2012 | Saedifaez | ............... | G06Q 10/06 |
| | | | | 705/26.5 |
| 2012/0331421 A1* | 12/2012 | Mohammed | ............ | G06F 3/048 |
| | | | | 715/841 |
| 2013/0311354 A1* | 11/2013 | Williams | ............ | G06Q 30/0645 |
| | | | | 705/38 |
| 2014/0024348 A1 | 1/2014 | Hurst et al. | | |
| 2014/0244315 A1* | 8/2014 | Cahill | .................... | G06Q 40/08 |
| | | | | 705/4 |
| 2014/0295819 A1* | 10/2014 | Chayon | ................... | G07F 9/002 |
| | | | | 455/418 |
| 2017/0205259 A1* | 7/2017 | Jang | .................... | G06F 3/03545 |
| 2018/0089733 A1* | 3/2018 | Huang | ............... | G06Q 30/0611 |

OTHER PUBLICATIONS

International Search Report and Written Opinion of the International Searching Authority; PCT/US2018/060632; dated Mar. 7, 2019.

\* cited by examiner

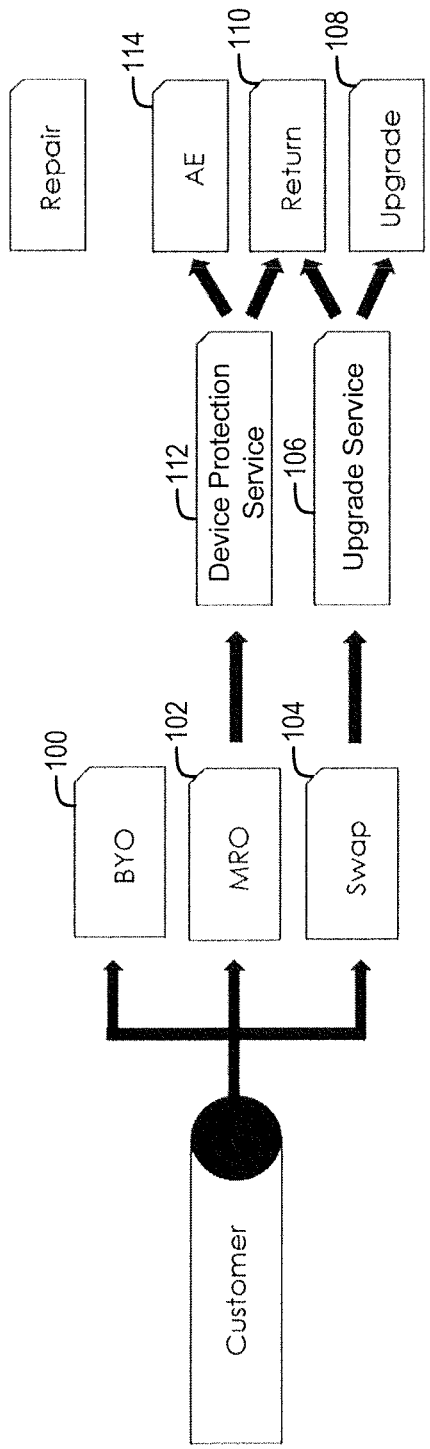
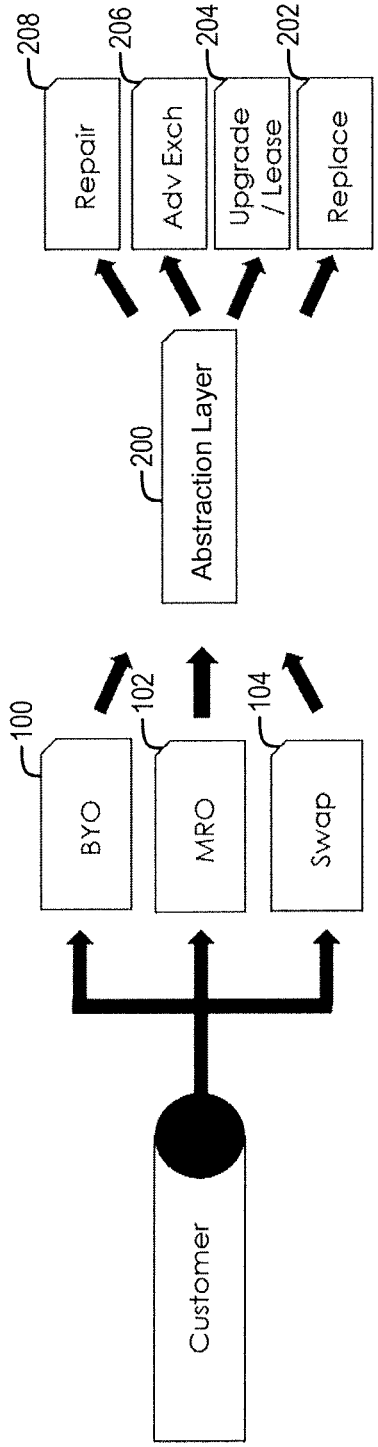
FIG. 1 (PRIOR ART)
FIG. 2

*Complete purchase screen (Shopping cart)*

COMPLETE PURCHASE   BACK

Name
> Martyn

Surname
> Miller

Mobile number
> 0413 067 370

Address
> 50 McSwain Street

Suburb
> Parkdale

State | Postcode
> VIC | 3159

*User completes form*

*Complete purchase screen (Shopping cart)*   BACK

TERMS

Lorem ipsum dolor sit amet, ea audiam eripuit laoreet eos, ei ceteros hendrerit moderatius pro. Te sumo case definitiones mei, pro eu mundi nusquam. In odio erant accusamus qui. simul intellegam qui id, iisque fierent vulputate quo cu. Dicat aeterno labores ei eos, quas harum ei nec. Id eos dicit electram.

Te vel vulputates disputationi, mel duis inani et. Ipsum choro consulatu quo an, discere comprehensam narn et. Cum cu corpora urbanitas, ex zril utamur qui. Per ad amet sale augue, congue iudico philosophia cu qui, vis ea tamquam contentiones Lorem ipsum dolor sit amet, ea audiam eripuit laoreet eos, ei ceteros hendrerit moderatius pro. Te sumo case definitiones mei, pro eu mundi nusquam. In odio erant accusamus qui. simul ☑ I agree to Terms

COMPLETE

*User completes form*

FIG. 17

User selects Lease offer

User selects yes

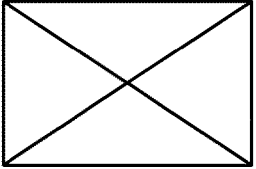

METHOD, SYSTEMS, AND COMPUTER-READABLE STORAGE MEDIA FOR REAL-TIME EVENT MANAGEMENT SYSTEM FOR MOBILE DEVICES

RELATED APPLICATIONS

This application claims the benefit of U.S. Provisional Application Ser. No. 62/585,763 filed Nov. 14, 2017, for a "Real-time Event Management System for Mobile Devices," which is hereby incorporated by reference in its entirety.

TECHNICAL FIELD

This system relates generally to a management and technical platform that provides consumers, carriers, OEMs and vendors the ability to manage the entire lifecycle of new and used mobile devices; in particular, this platform integrates functionality of multiple underlying systems and device-level diagnostic data to manage the device lifecycle through acquisition to disposition, in real time, including supply chain management, an end-to-end view for carriers and OEMs, and seamless integration of options for the consumer in regards to the consumer's unique characteristics and relationship within the mobile eco system.

BACKGROUND AND SUMMARY

Mobile devices go through a service lifecycle. FIG. 1 illustrates events that often occur during a mobile device's typical lifecycle for a variety of users. As discussed below, there are downsides to the existing lifecycle shown in FIG. 1, which increase complexity and can cause a poor user experience. For example, a user can be caught in a dead end journey in which there is no way to upgrade their device or there may be gaps in device protection. There can also be difficulties promoting loyalty among users.

The lifecycle starts when a user acquires a mobile device. There are several ways in which this can happen. Some users may purchase a mobile device outright, whether a new mobile device or one that is preowned. This type of user is represented in FIG. 1 as BYO (bring your own device) 100 and will have already purchased their mobile device upfront when going to a carrier for network service. Some users will finance the purchase of their mobile device, which could be through the carrier, OEM or other financing entity. This type of user is represented in FIG. 1 as MRO (mobile repayment option) 102. The lifecycle begins for other devices when a user upgrades from their existing mobile device, such as by accepting an offer to lease an upgraded mobile device. This type of user is represented in FIG. 1 as swap 104.

In the existing lifecycle, there are different types of service options available depending on the type of user. This creates complexity and confusion in which users may not know what options are available, and some services may overlap. These complexities are illustrated in the options available to users in FIG. 1. In the example shown, the swap user 104 has the option of an upgrade service 106, which provides the user with access to an early upgrade 108 or return 110 if their mobile device has a malfunction or breaks. As shown, the MRO user 102 has the option of a device protection service 112, which provides the user with access to return 110 the device or perform an advanced exchange 114, which allows the user to obtain a loaner device when their device is being returned. As shown, none of the users have access to get their phone repaired. Also, the BYO user does not have access to either the device protection service 112 or the upgrade service 110. One technical obstacle to offering these services to the BYO user is that their device is unknown to the entities that offer these services, and therefore the device could have a preexisting fault or technical error that increases the risk for these services. Regardless, the lack of any service options for the BYO user reduces stickiness for the carrier and increases turnover of BYO users.

In addition to the complexity of potentially overlapping options in the existing lifecycle, there can be delays in these services that frustrate consumers. For example, a user of a mobile device for which a device protection claim must be adjudicated, cannot upgrade to a different mobile device until the claim adjudication is complete, which could take several days. There are multiple technical obstacles to providing an upgrade path while a claim is being adjudicated. For example, the claim protection service and upgrade service are typical offered by different entities. By way of another example, there are fraud risks to providing an upgraded phone without first receiving a user's existing device in good working order. Additionally, there are concerns about the impact claim adjudication can take on the value of the user's existing device as time passes, which can reduce profitability if the existing device is resold after repair.

According to one aspect, this disclosure provides a computerized system of managing events surrounding the lifecycle of used and new mobile devices. In some embodiments, the system provides a "360 view" that integrates a mobile device's service options, such as financing and device protection, as well as at the device level regarding potential hardware/software errors. This provides carriers and/or OEMs with an end-to-end view of consumers, such as claims on device protection plans, repayment issues, utilization of upgrades and/or other information in a user's profile across multiple underlying systems during the device's lifecycle. The system tracks, in some embodiments, multiple characteristics of the mobile device, such as tracking of the device's sale (through multiple potential channels) and distribution through the supply chain, the device's quality, which could be determined through diagnostics (and allow device protection options to BYO users), the device's value, which could be forecasted using an algorithm, and the device's history. In some embodiments, the system includes a fraud prevention feature. For example, the system could aid in disabling network access to a device that has been traded-in or is subject to a claim adjudication after activation of an upgraded/replacement device.

The system is configured with business rules to handle certain events. In response to some triggering events, such as a device fault, contract ending, promotional offer, etc., the system is configured to seamlessly present the user with an integrated view of the plans/services available to the user, including potentially an integrated view of both financing and device protection options, even though the system must aggregate these options from multiple underlying systems. This reduces confusion surrounding what options are available to the user and enhances the user experience. In some cases, the consumer may be able to customize the initial options suggested by the system that are available to the consumer. In this way, the system can reduce confusion by suggesting an initial set of options available to the consumer, but still allow flexibility for customization.

In some embodiments, a diagnostic tool is installed on the mobile device that is configured to detect potential hardware and/or software problems. In addition to triggering the presentation of service options, the diagnostic tool solves a technical problem of offering a BYO user access to device protection options. The diagnostic tool allows providers of the service options some assurance that the BYO device is in good working order, which enables these service options, such as device protection.

Embodiments are contemplated in which the system allows a user to simultaneously perform a device upgrade at the same time as adjudicating a device protection claim. These two existing serial processes are performed in parallel, which speeds the time in which the user obtains the upgraded device. These processes can run in parallel paths due to a supply chain management system that provides real time event management during the upgrade and device protection claim. This allows the system to simultaneously track the location of the outbound (upgraded) mobile device and the inbound (protection claim) mobile device at the same time based on the IMEI numbers of the devices. Certain events can be triggered based on this tracking, such as updating in real time the IMEI number associated with the user's profile responsive to the outbound (upgraded) device activation. Additionally, in some embodiments, the system messages the carrier in real time to block the IMEI of the inbound (protection claim) device responsive to activation of the outbound (upgraded) device activation. This supply chain management in which events are tracked and triggered based on IMEI numbers solves a technical problem associated with potential fraud, and allows the user to receive the upgraded device more quickly. In some cases, the supply chain management determines a location in which to ship the inbound (protection claim) device based on the claim adjudication to more quickly resell the device, which potentially increases the device's resale price. Accordingly, in some embodiments, the IMEI number of mobile devices can be tracked throughout the entire lifecycle.

BRIEF DESCRIPTION OF THE DRAWINGS

The present disclosure will be described hereafter with reference to the attached drawings which are given as non-limiting examples only, in which:

FIG. 1 is block diagram of existing options available to different types of mobile device users;

FIG. 2 is block diagram of showing example options available to different types of mobile device users according to an embodiment of the present invention;

FIGS. 8-17 are screenshots showing an example user interface for a mobile device user to select potential service options triggered by a diagnostic app on the mobile device according to an embodiment of the present invention;

FIGS. 18-25 are screenshots showing an example user interface for a mobile device user to select potential service options triggered by an offer associated with the user's profile according to an embodiment of the present invention.

Figure 3:
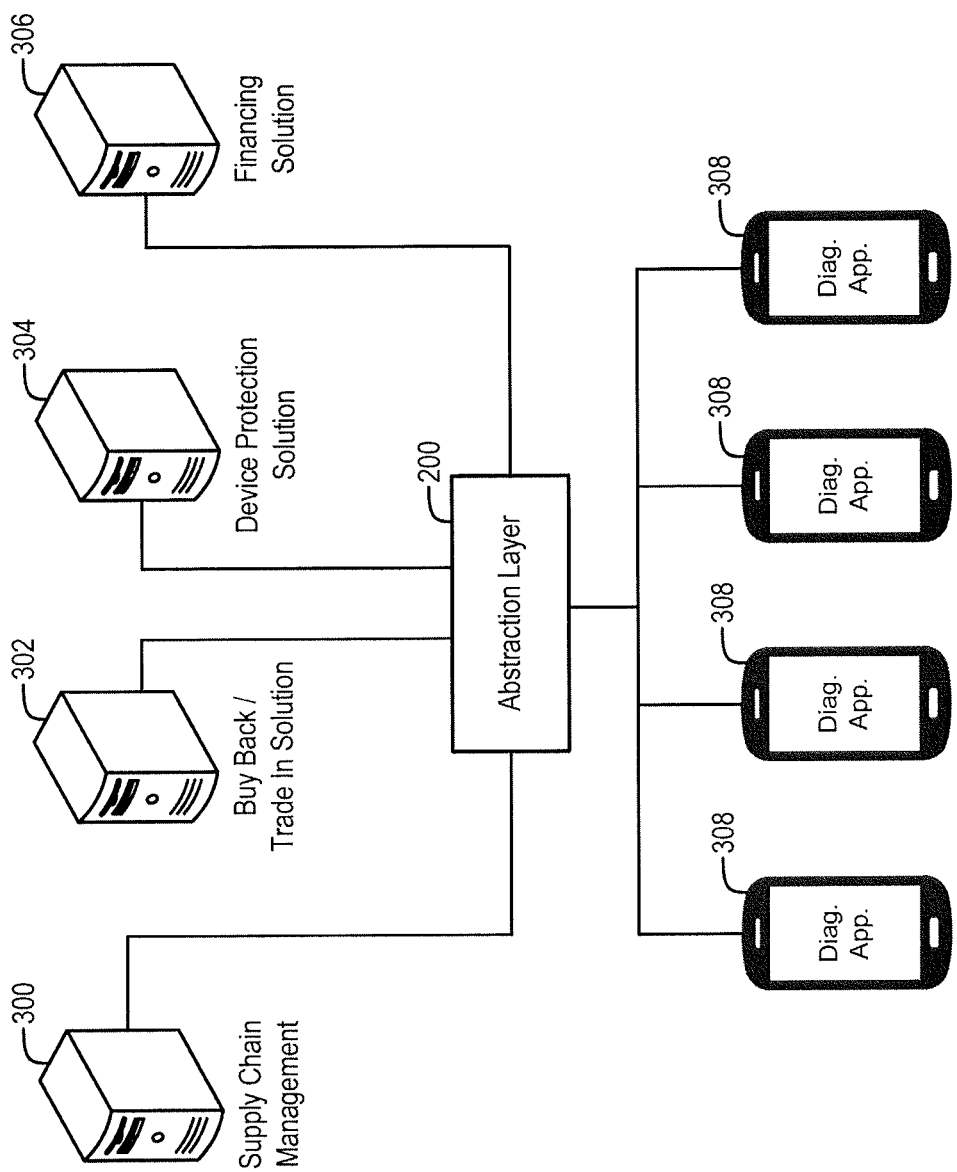
FIG. 3 is a diagrammatic view of an example system for managing the lifecycle of a mobile phone according to an embodiment of the present invention.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

This invention relates to a computerized system of managing events surrounding a lifecycle of a mobile phone. In some embodiments, the system provides an integrated view of the mobile device user's profile, including which plans/services to which the user is subscribed and a device-level view that identifies potential hardware or software problems of the device. This provides carriers and OEMs an end-to-end view of the device history and user service choices, which provides valuable information regarding users and/or their mobile devices. For example, carriers and device OEMs would obtain an integrated view about the device and/or user through the entire lifecycle, such as the number of device protection claims, payment issues for financing, which types of triggering events resulted in upgrades, etc. Additionally, this allows options in the mobile device user's services, including but not limited to, the mobile device user's financing, device protection, and buy back/trade in to be triggered using diagnostic tools on the user's device. In addition to triggering service options, the diagnostic tool installed on the user's mobile device, solves a technical problem of offering a BYO user access to device protection options.

In some embodiments, the system allows a user to simultaneously perform a phone upgrade at the same time as filing a device protection claim. These two existing serial processes are performed in parallel, which speeds the time in which the user obtains the upgraded device. These processes can run in parallel paths due to a supply chain management system that provides real time event management during the upgrade and device protection claim. This allows the system to simultaneously track the location of the outbound (upgraded) mobile device and the inbound (protection claim) mobile device at the same time based on the IMEI numbers of the devices. Certain events can be triggered based on this tracking, such as updating in real time the IMEI number associated with the user's profile responsive to the outbound (upgraded) device activation. Additionally, in some embodiments, the system messages the carrier in real time to block the IMEI of the inbound (protection claim) device responsive to activation of the outbound (upgraded) device activation. This supply chain management in which events are tracked and triggered based on IMEI numbers solves a technical problem associated with potential fraud, and allows the user to receive the upgraded device more quickly. In some cases, the supply chain management determines a location in which to ship the inbound (protection claim) device based on the claim to more quickly resell the device, which potentially increases the device's resale price.

FIG. 2 illustrates a lifecycle of a mobile device according to an embodiment of the system, and provides a contrast to the existing mobile device lifecycle shown in FIG. 1, which is described above. As shown, there are three example types of user, which are the same users illustrated in FIG. 1. In this embodiment, the system includes an abstraction layer 200 that connects with multiple underlying systems relating to various services available to users, such as buy back/trade in (BBTI), device protection and financing solutions (see FIG. 3). By having access to these systems, the abstraction layer 200 is able to pull together offers available for multiple solutions that are specific to the user. In the example shown, the abstraction layer 200 is able to pull together information regarding options for replacement 202, upgrade/lease 204, advanced exchange 206 and/or repair 208 of a mobile device associated with a user. For example, based on a triggering event, the abstraction layer 200 could provide a user interface from which the user is presented with options for upgrading, replacement, repair of the mobile device specific with the user's profile. The triggering event could be a diagnostic tool on the mobile device identifying a potential hardware/software problem, such as a battery malfunction, or a promotion that would be applicable to the user, such as based on a length of time left in the user's contract. This unifies the options for the user in a seamless manner, which increases simplicity and enhances the user experience.

In the example shown in FIG. 2, each type of user has access of all service options. This stands in contrast to the lifecycle shown in FIG. 1 in which the service options depend on the type of user, and there are overlapping services. Additionally, in this example, the BYO user 100 has access to the same service options as the MRO 102 and swap 104 users. There is a technical obstacle to offering this level of service options to a BYO user due to the BYO device being unknown in quality as to potential hardware and/or software problems. Unlike MRO and swap users, which start the lifecycle with new mobile devices, a BYO user may start the lifecycle with a preowned mobile device. In some embodiments, the abstraction layer 200 is able to offer these service levels by communicating with a diagnostic tool installed on the BYO device. The diagnostic tool would be able to identify any potential hardware/software problems prior to offering the services, and would be used to trigger potential service offers as explained below.

Referring to FIG. 3, there is shown a high level diagrammatic view of the abstraction layer 200 connected with a plurality of devices on a network. In the example shown, the abstraction layer 200 is configured to communicate with a supply chain management system 300, a buy back/trade in system 302, a device protection system 304, and a financing system 306. Although these systems 300, 302, 304, 306 may be operated by different entities, the abstraction layer 200 is able to extract/update data from these systems using a variety of APIs. There are several technical benefits to the abstraction layer integrating these systems. In the enrollment or renewal of a user, for example, the in-store transaction speed of a carrier and/or OEM will be greatly increased. Instead of interacting with separate systems for enrolling a customer in financing and device protection options, the service representative can interact with the abstraction layer 200—not moving in and out of separate systems for financing and device protection. This approach is estimated to speed up in-store transactions by at least 20-30 minutes.

As shown, the abstraction layer 200 is configured to communicate with a plurality of mobile devices 308 via a network. Accordingly, the abstraction layer 200 allows service options from multiple systems to be seamlessly presented as an integrated view to the user on their mobile device 308. The presentation of service options to the user can be triggered in a variety of ways, such as when a user qualifies for a particular offer or if software installed on the user's mobile device identifies a potential hardware and/or software problem. In this example, the mobile devices 308 have installed a diagnostic app that is configured to identify potential hardware and/or software problems on the mobile device. In some embodiments, this could be used to trigger potential service options available to the user, such as repair, replacement, upgrade, etc., based on the user's profile by extracting data about the user from the multiple systems 300, 302, 304, 306. Embodiments are contemplated in which the mobile devices 308 may be devices running the Android™ operating system by Google, Inc. of Mountain View, Calif. or a device running iOS™ operating system by Apple Inc. of Cupertino, Calif. on which software has been installed to run one or more methods according to an embodiment of the present disclosure. For example, the mobile devices 308 may have an app installed that allows the abstraction layer to coordinate with (or is integrated into) the diagnostic tool to perform actions described herein. Thus, users may interact with the abstraction layer 200 using an app installed on the mobile devices 308 that allows an integrated presentation of service options from the multiple systems 300, 302, 304, 306 and perform other actions described herein. In some embodiments, certain functionality of the abstraction layer 200 could be hosted on a web server and accessed by users via a web browser on the mobile device, such as Safari™ by Apple Inc.

Although this example shows four systems 300, 302, 304, 306 to which the abstraction layer 200 communicates in FIG. 3 for purposes of simplicity, there could be numerous other systems to which the abstraction layer 200 is configured to communicate. Likewise, even though only four mobile devices 308 are shown for purposes of simplicity, there could be more mobile devices (e.g., thousands or millions) to which the abstraction layer 200 is configured to communicate.

Figure 4:
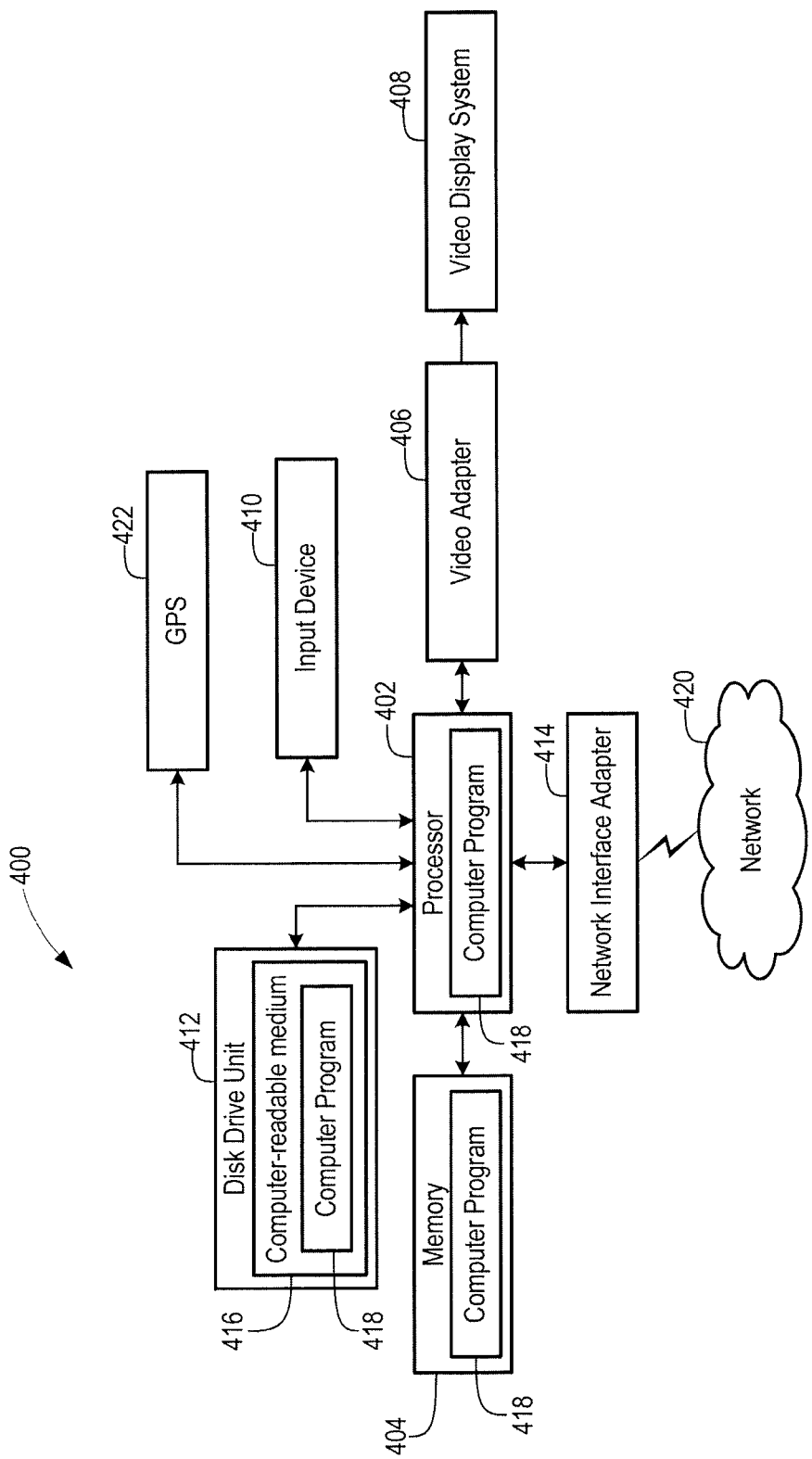
FIG. 4 is a block diagram of an example device that could be used in conjunction with the system and method according to an embodiment of the present invention.

FIG. 4 illustrates a diagrammatic representation of a device on which the abstraction layer 200 could execute in the example form of a machine 200 that may be programmed with a set of instructions to perform any one or more of the methods discussed herein. The set of instructions could be a computer program stored locally on the device that, when executed, causes the device to perform one or more of the methods discussed herein. In some embodiments, at least a portion of the set of instructions could be stored remotely such that, when executed, causes the device to perform one or more of the methods discussed herein. In embodiments where the computer program is locally stored, data may be retrieved from local storage or from a remote location via a network. Embodiments are contemplated in which the certain functions of the abstraction layer 200 could be performed on a server and/or mobile devices 308. The terms "mobile device," "computer" and "server" shall also be taken to include any collection of machines that individually or jointly execute a set (or multiple sets) of instructions to perform any one or more of the methods discussed herein.

The machine 400 illustrated in FIG. 4 includes a processor 402 (e.g., a central processing unit ("CPU")), a memory 404, a video adapter 406 that drives a video display system 408 (e.g., a liquid crystal display ("LCD") or a cathode ray tube ("CRT")), an input device 410 (e.g., a keyboard, mouse, touch screen display, etc.) for the user to interact with the program, a disk drive unit 412, and a network interface adapter 414. Note that various embodiments will not always include all of these peripheral devices.

The disk drive unit 412 includes a computer-readable medium 416 on which is stored one or more sets of computer instructions and data structures embodying or utilized by a computer program 418 performing one or more of the methods described herein. The computer instructions and data structures may also reside, completely or at least partially, within the memory 404 and/or within the processor 402 during execution thereof by the machine 400; accordingly, the memory 404 and the processor 402 also constitute computer-readable media. Embodiments are contemplated in which the computer program 418 may be transmitted or received over the network 420 via the network interface device 414 utilizing any one of a number of transfer protocols including but not limited to the hypertext transfer protocol ("HTTP") and file transfer protocol ("FTP").

While the computer-readable medium 416 is shown in the example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing a set of instructions for execution by the machine and that cause the machine to perform any one or more of the methods described herein, or that is capable of storing data structures utilized by or associated with such a set of instructions. The term "computer-readable medium" shall accordingly be taken to include, but not be limited to, solid-state memories, optical media, flash memory, and magnetic media.

Figure 5:
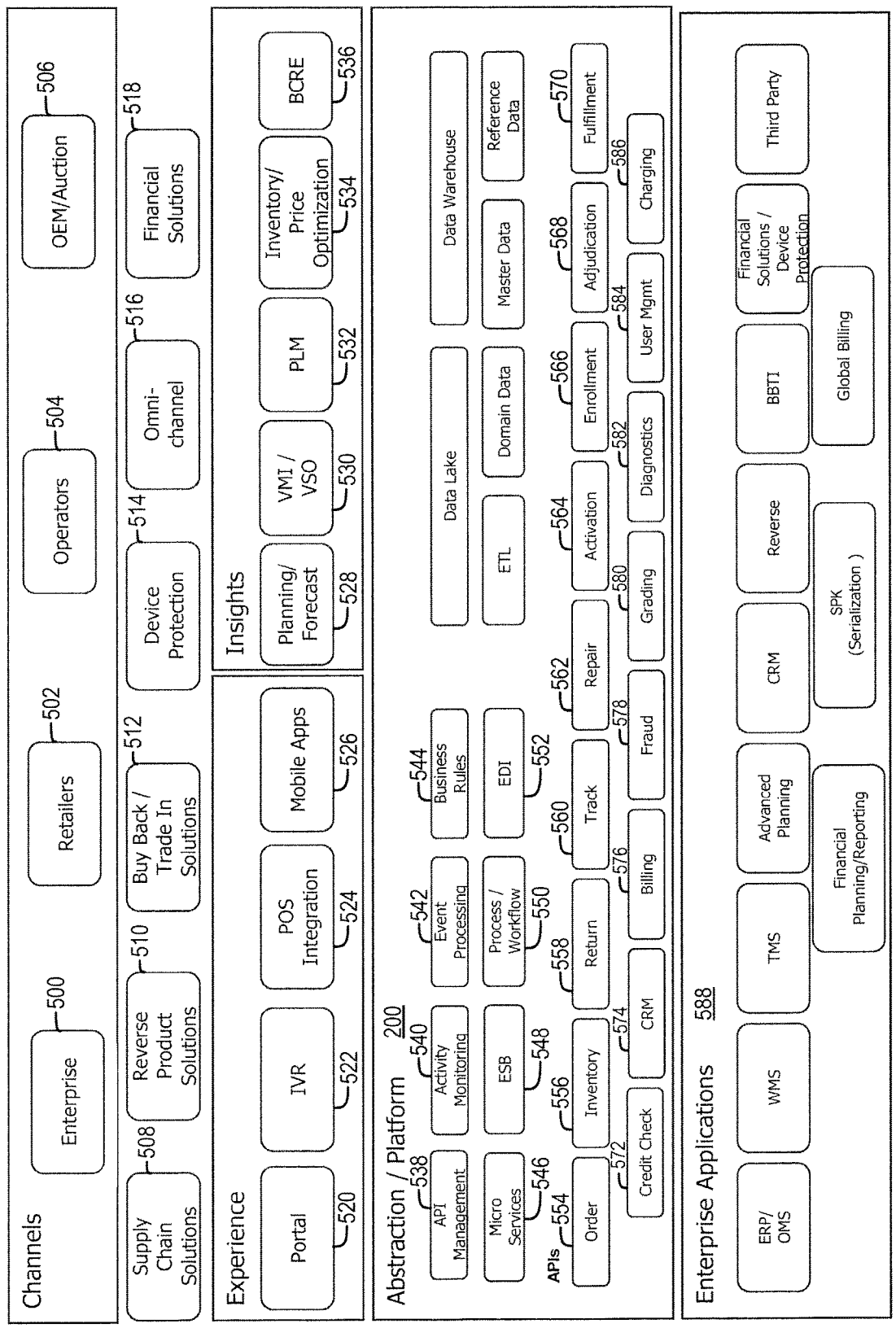
FIG. 5 is a block diagram showing example modules that could be included in the system according to an embodiment of the present invention.

FIG. 5 illustrates example modules that could be included in the system. In this example, the abstraction layer 200 is configured to operate with a plurality of channels from which users can acquire mobile devices. As shown, the channels include enterprise 500, retailers 502, operators 504 and OEM/auction 506. Although these channels from which users can acquire mobile devices are shown for purposes of simplicity, other channels could be provided depending on the circumstances.

There is a plurality of service options offered through these channels 500, 502, 504, 506. As shown, the service options offered through the channels include supply chain solutions 508, reverse product solutions 510, buy back/trade in solutions 512, device protection 514, omni-channel 516 and financial solutions 518. The supply chain solutions 508 provide tracking, ordering, inventory and other logistical functionality for the channels. The reverse product solutions 510 could provide a return functionality for the channels. The buy back/trade in solutions 512 could provide an option for users to sell back their mobile device or receive a credit value, which could be applied to a new device. The device protection 514 could be a service that allows malfunctioning or broken devices to be returned or repaired. The omni-channel option could aid with channels offering delivery of devices to users upon selection at a sales location. The financial solutions 518 could be a service that manages financing and lease options for mobile devices.

The users may interact with the abstraction layer 200 in a variety of manners. In the example shown, the user may access service options for his/her mobile device using a web portal 520, an interactive voice response system 522, a point of sale integration 524, and/or an app 526 installed on the user's mobile device 308. Regardless of how the user interacts with the abstraction layer 200, the user can be presented with service options specific to that particular user.

The system may include functionality for inventory management, forecasting, and other supply chain functionality. As shown, the system includes modules for planning/forecast 528, VMI/VSO (vendor managed inventory) 530, PLI (product lifecycle management) 532, inventory/price optimization 534, and BCRE 536. Other functionality regarding inventory management and other forecasting may be provided depending on the circumstances.

In the example shown, the abstraction layer 200 includes a plurality of modules. As shown, the abstraction layer 200 includes API management 538, activity monitoring 540, event processing 542, business rules 544, microservices 546 (e.g., modular services), ESB (enterprise service bus) 548, process/workflow 550 and EDI (electronic data exchange) 552. These modules perform certain of the actions, tracking, and event monitoring as described herein.

As shown, the abstraction layer 200 includes a plurality of APIs that expose data/services from a plurality of systems. In some embodiments, an API gateway offered from Software AG of Darmstadt, Germany could be used. In this example, there are APIs to expose data/services for order 554 (for ordering mobile devices), inventory 556 (for determining/updating device inventory), return 558 (managing return processing), track 560 (tracking location of mobile devices by IMEI), repair 562 (managing repair processing), activation 564 (managing activation processing), enrollment 566 (managing enrollment processing), adjudication 568 (managing device protection claim adjudication processing), fulfillment 570 (managing processing of order fulfillment), credit check 572 (managing credit check for users), CRM 574 (managing data associated with user), billing 576 (managing billing processes), fraud 578 (detecting potential fraud), grading 580 (determining quality and grade of mobile device), diagnostics 582 (identifying potential faults in hardware/software on mobile device), user management 584 (managing users of mobile devices) and charging 586 (managing charging of mobile devices). In some embodiments, the abstraction layer 200 could include additional APIs to access additional systems or may not include each of these APIs depending on the circumstances. As shown, the abstraction layer 200 is configured to interact with a plurality of enterprise applications 588 via the APIs. By interacting with the plurality of enterprise applications 588, the abstraction layer 200 is configured to integrate multiple service options for users.

Figure 6:
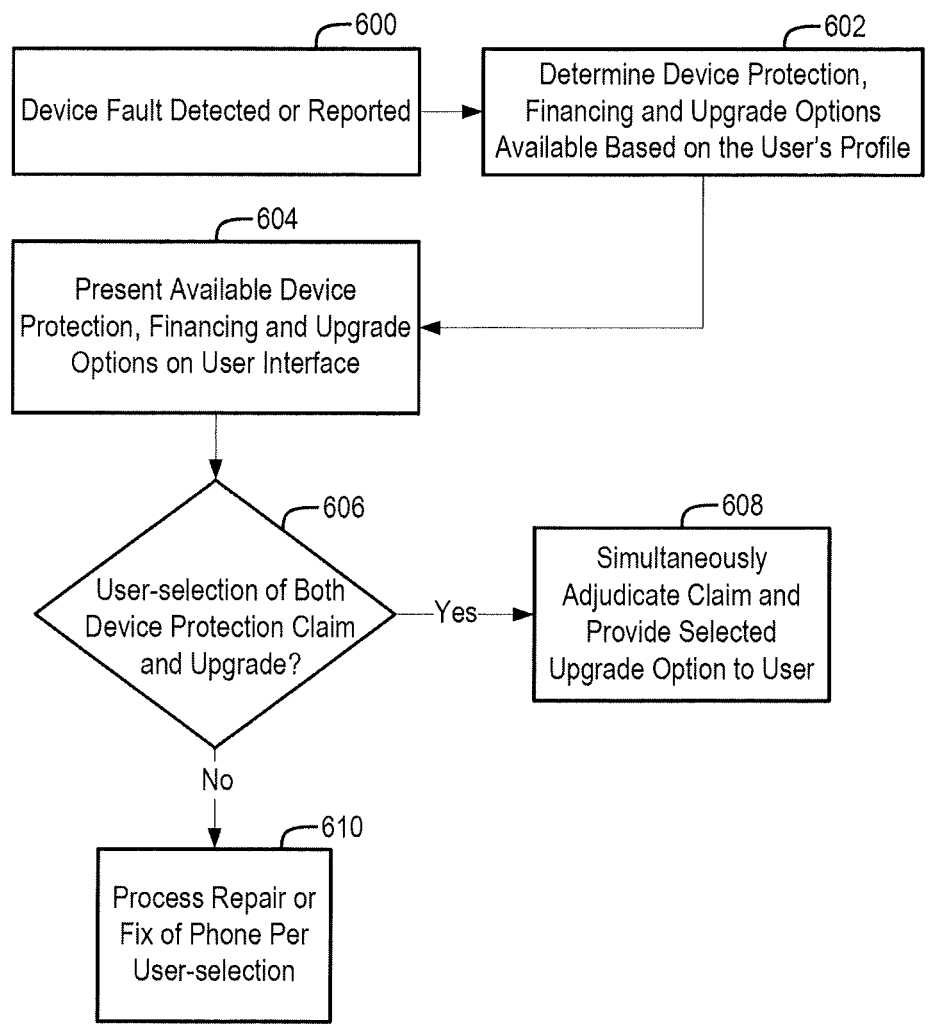
FIG. 6 is a flowchart of an example process that could be used by the system for managing options during the lifecycle of a mobile device according to an embodiment of the present invention.
Figure 8:
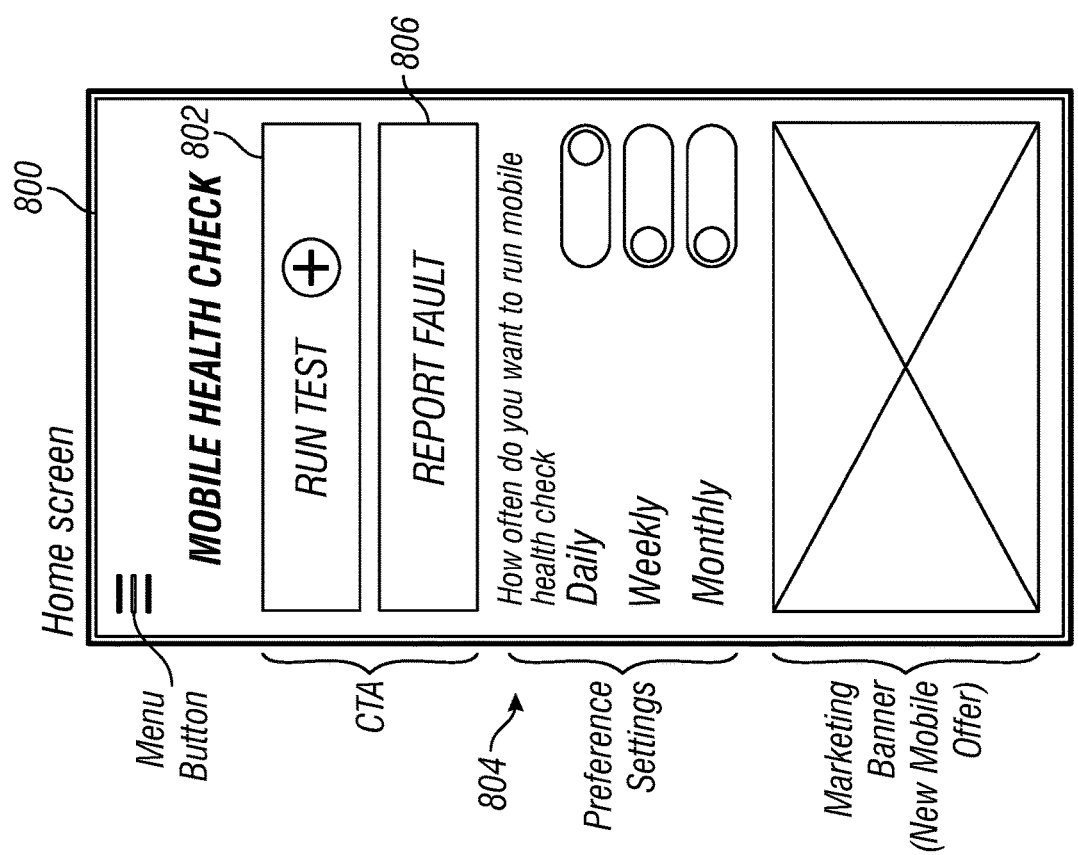
Figure 11:
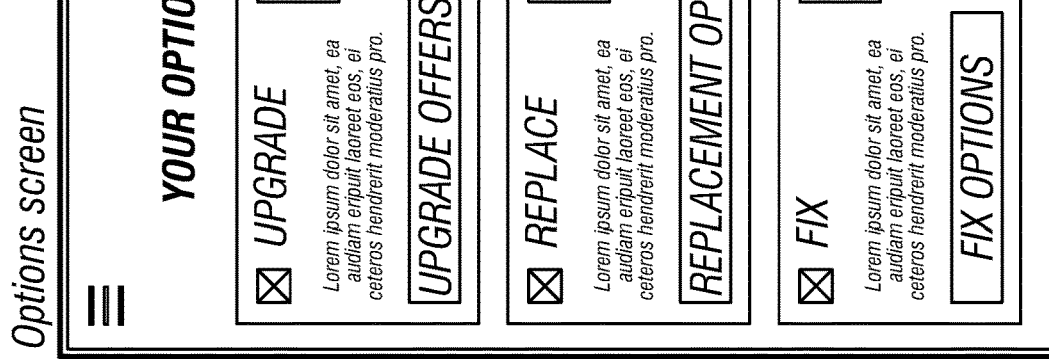

FIG. 6 is a flow chart illustrating potential actions that may be performed upon detection of a fault on the mobile device. As discussed above, a diagnostic app may be installed on the mobile device that is configured to detect potential hardware/software problems with the mobile device. The process in FIG. 6 starts with a device problem being detected or reported by the user (block 600). FIG. 8 illustrates a potential user interface for an app on the mobile device that allows the user to interact with the abstraction layer 200. In this example, a diagnostic function is integrated in the app. As shown, the user interface 800 includes a portion 802 that allows the user to manually initiate a diagnostic test. In the embodiment shown, the user interface 800 includes a portion 804 for scheduling automatic periodic diagnostic tests. The user interface 800 in some cases may include a portion 806 that allows a user to manually report a fault, which is describes below with respect to FIGS. 26-31.

Figure 9:
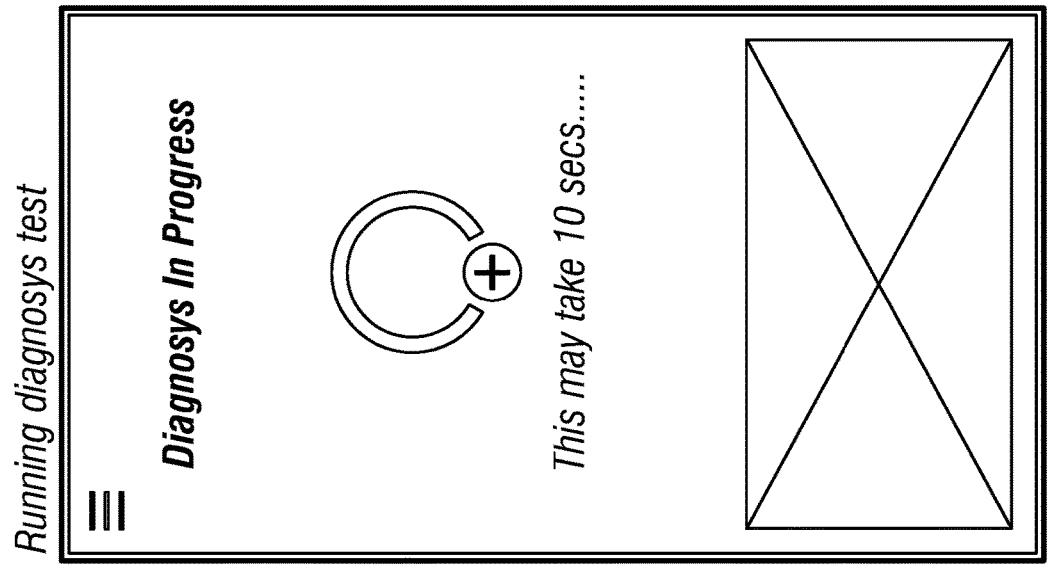
Figure 10:
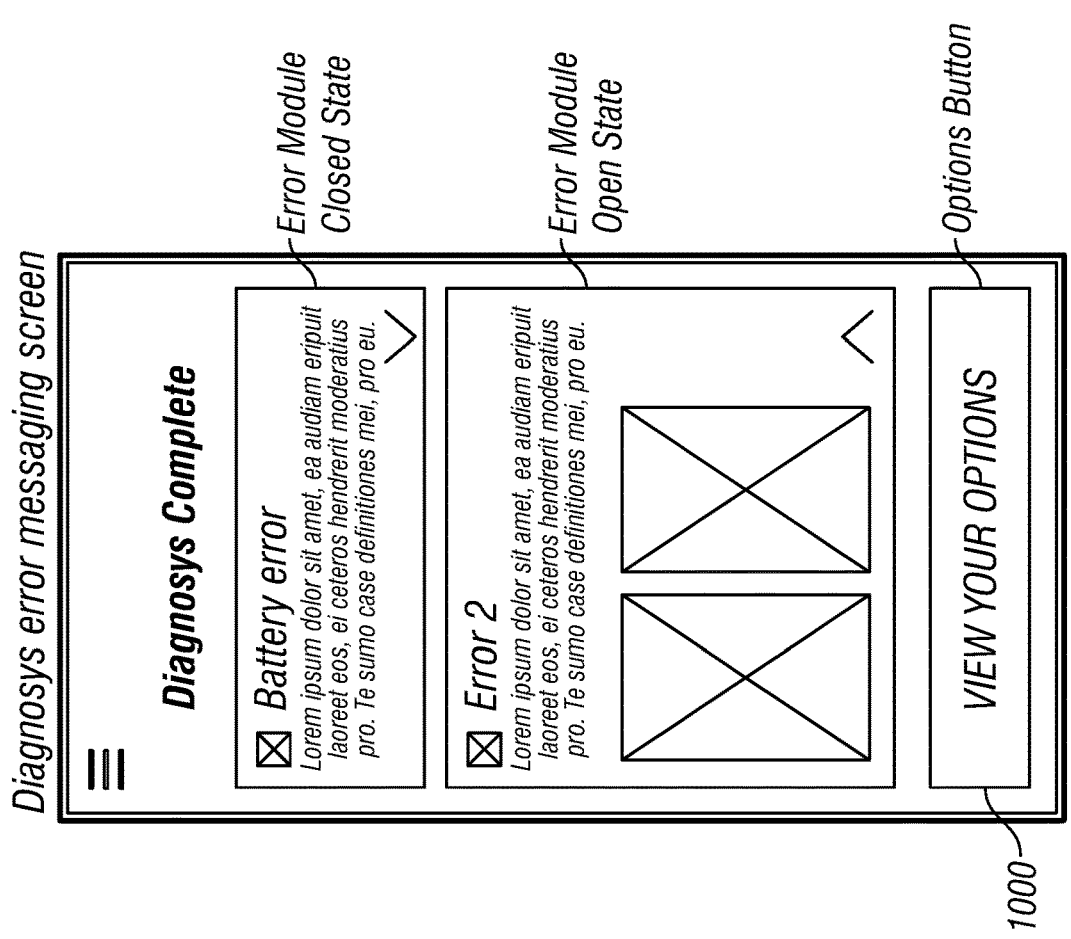
Figure 13:
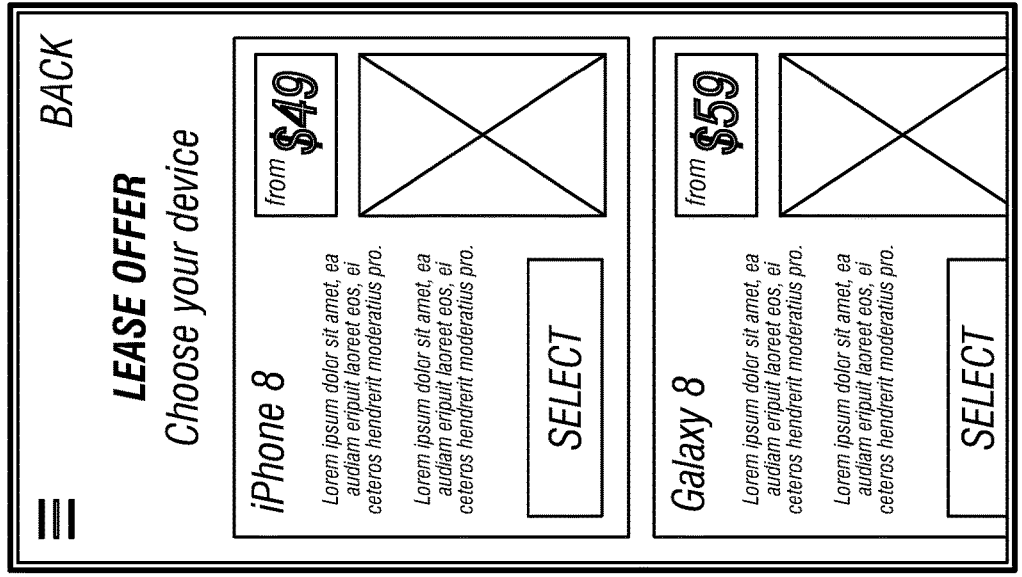
Figure 12:
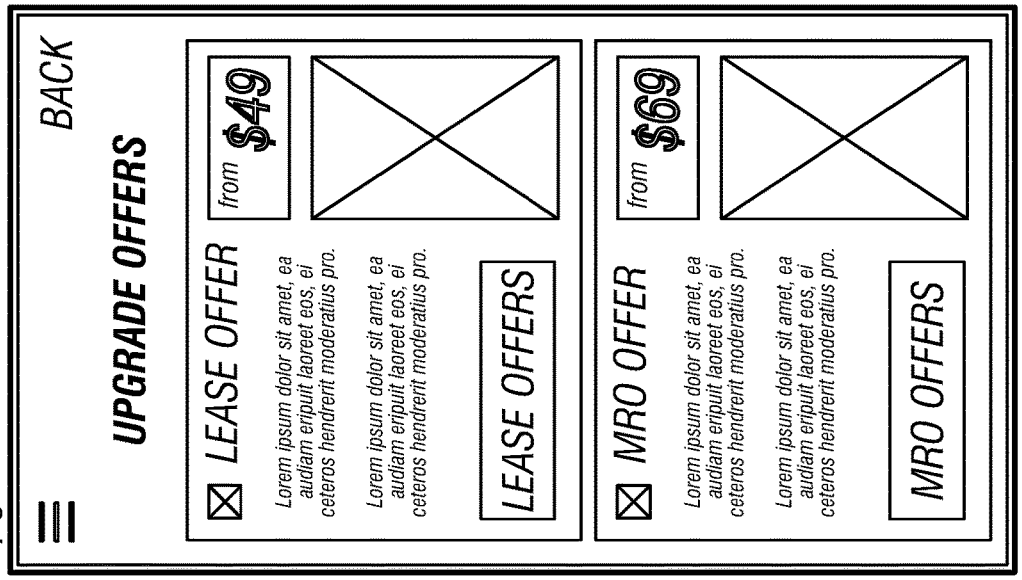
Figure 15:
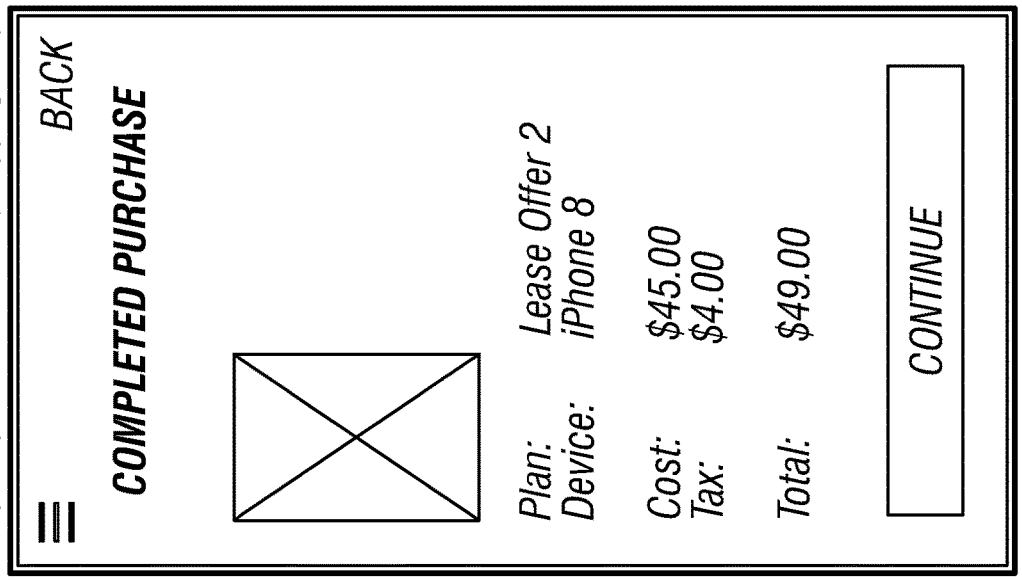
Figure 14:
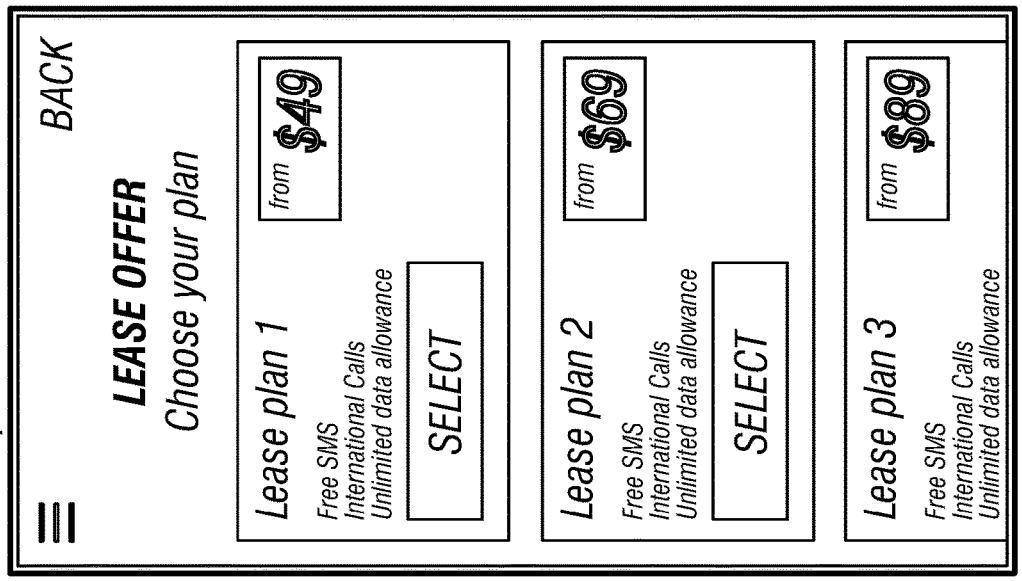
Figure 19:
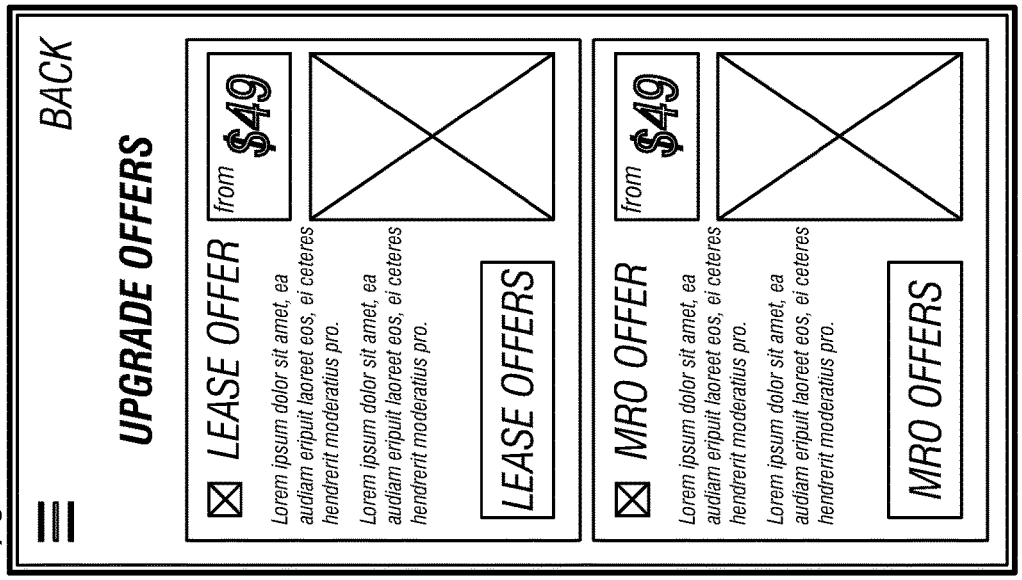
Figure 18:
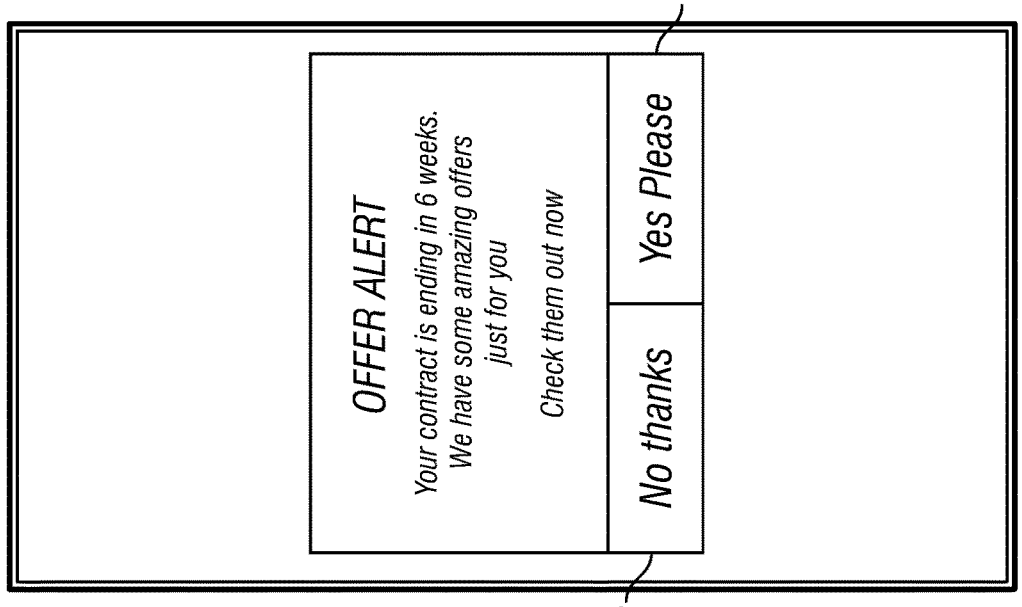
Figure 21:
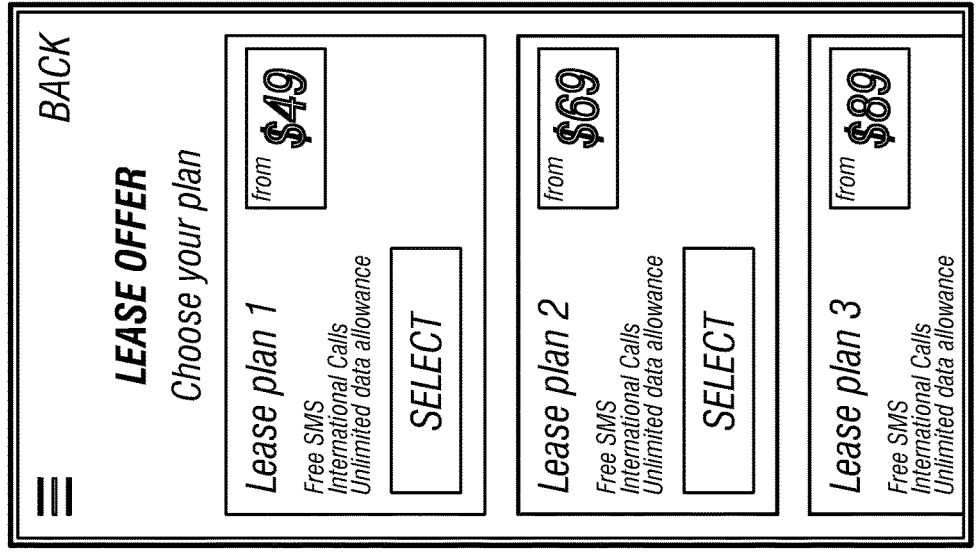
Figure 20:
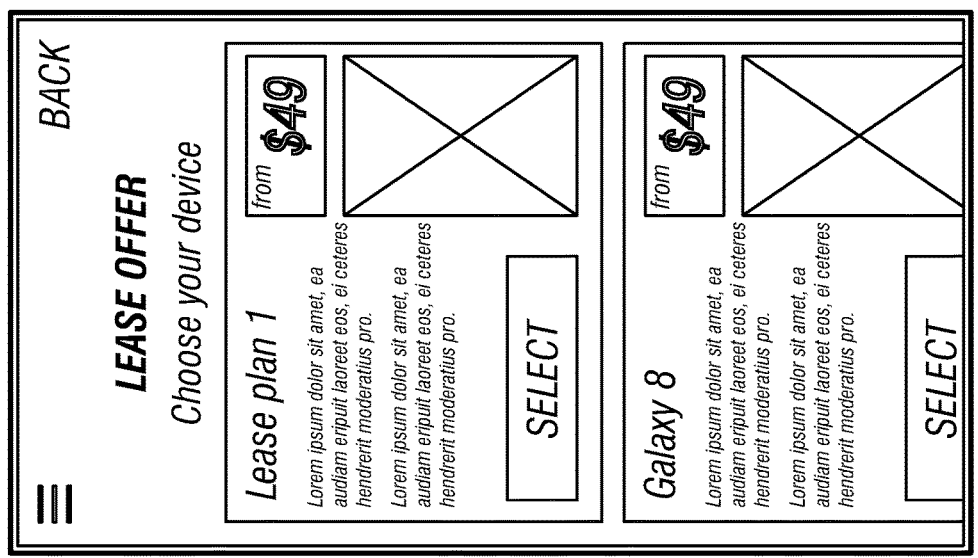
Figures 24, 25:
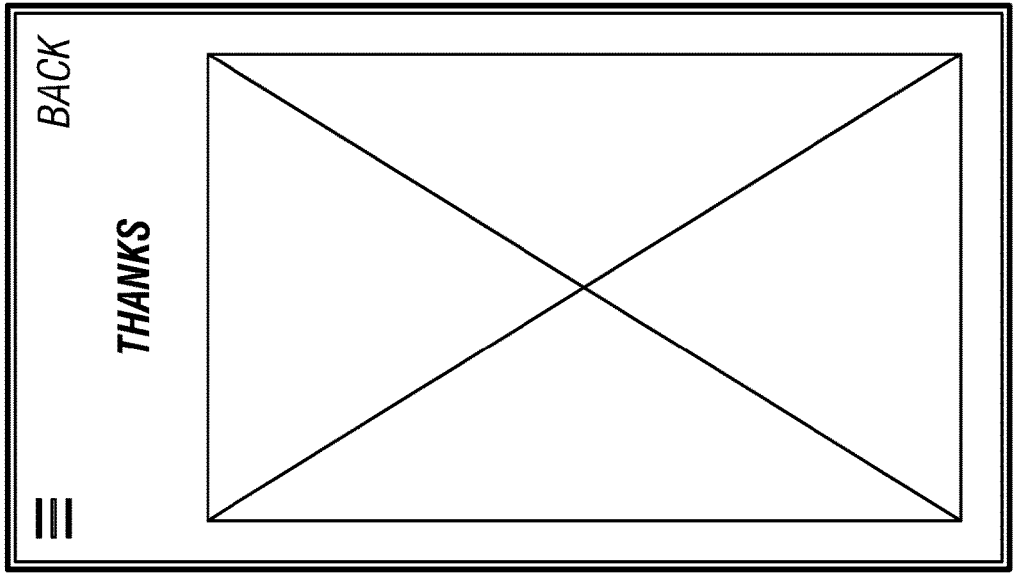
Figure 27:
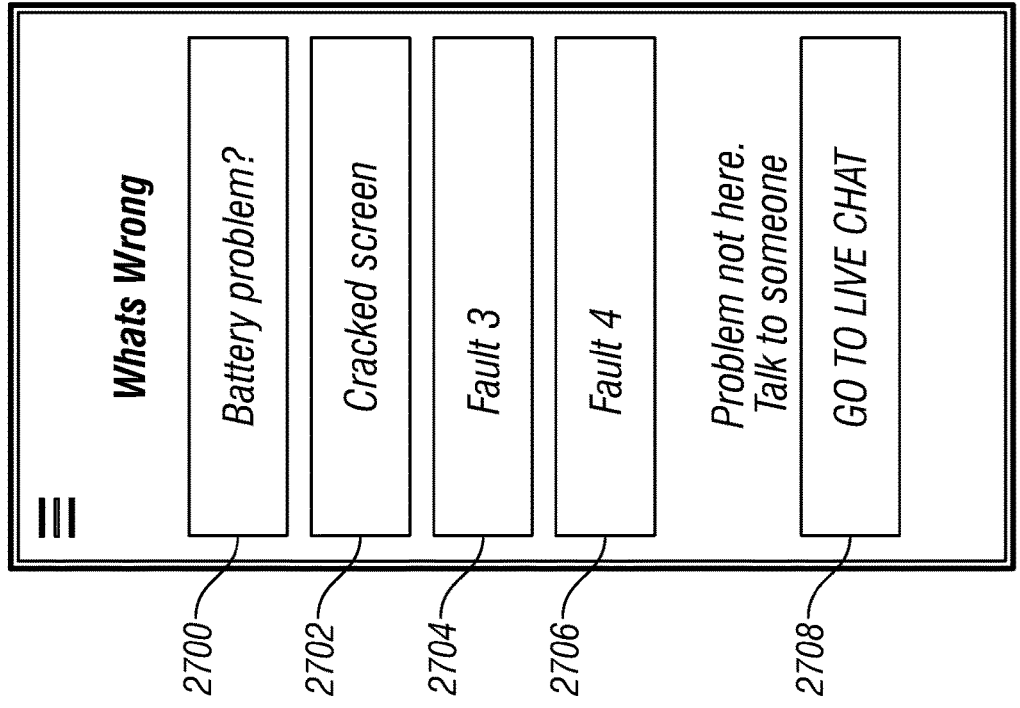
FIGS. 26-31 are screenshots showing an example user interface for a mobile device user to select potential service options triggered by a diagnostic app on the mobile device and schedule an in-store pickup according to an embodiment of the present invention.
Figure 26:
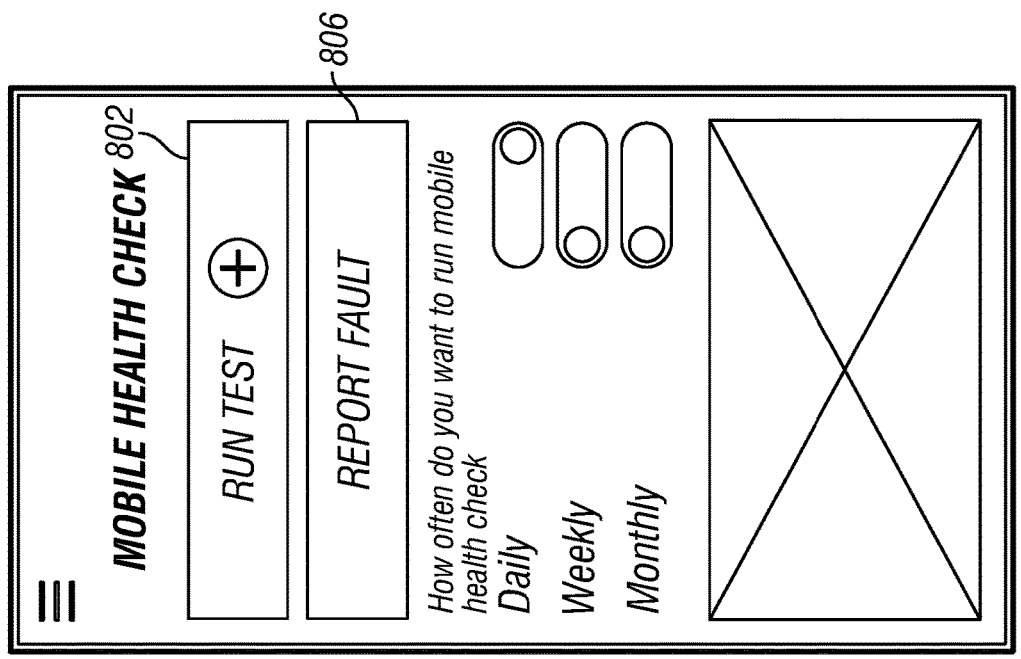

Upon receiving a detection or report of a fault, the abstraction layer 200 will determine what service options are available to the user. These options are pulled from multiple systems, including buy back/trade in system 302, device protection system 304 and/or financing system 306. FIG. 9 illustrates an example user interface 800 upon selecting the portion 802 to initiate a diagnostic test. FIG. 10 shows the example user interface 800 upon detecting one or more faults in the mobile device. In this example, the user interface 800 includes a portion 1000 that allows a user to determine what options are available based on detection of a hardware/software problem. Upon selecting this portion 1000, the abstraction layer 200 will use the APIs to pull information about service options to which the user qualifies. In the example shown, the user is presented with an upgrade option 1100, a replacement option 1102, and an option to fix the mobile device 1104 via the user interface 800 (Block 604 in FIG. 6). The options and pricing presented to the user is based on that user's particular profile. The user can select options as desired as shown in FIGS. 12-17. The process continues with a determination of user selections (block 606). If the user selects both a device protection claim due to the device fault and an upgrade option, these will be processed simultaneously (block 608). Otherwise, if the user only selects a device protection claim, that will be processed accordingly (block 610).

FIGS. 18-25 illustrate another trigger for showing a user potential service options. In this example, the abstraction layer 200 triggers the presentation of service options based on a predetermined time period until the ends of the user's contract. For example, there could be business rules in the abstraction layer 200 that trigger a notification to a user based on six weeks (or other predetermined time period) left in the user's contract. The abstraction layer 200 is able to determine how much time is left in the user's contract due to communication through APIs with financing systems managing the user. In the embodiment shown, the user is presented with a user interface on the mobile device with a notification that there is only six weeks left in the user's contract. Although a user with a contract is described for purposes of illustration, this notification could provided to a BYO user for which there is a special lease offer or other type of user. As shown, the user can select between closing the notification (1800) or requesting to see the offers (1802). FIGS. 19-25 illustration how the user can select one of the service offers and have their new device shipped to a location of their choosing.

Figure 29:
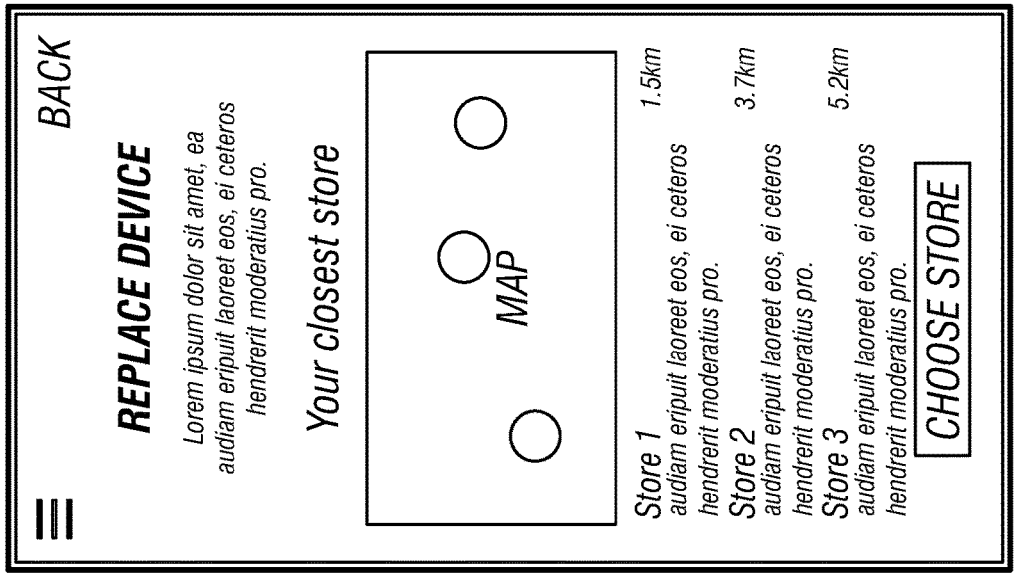
Figure 28:
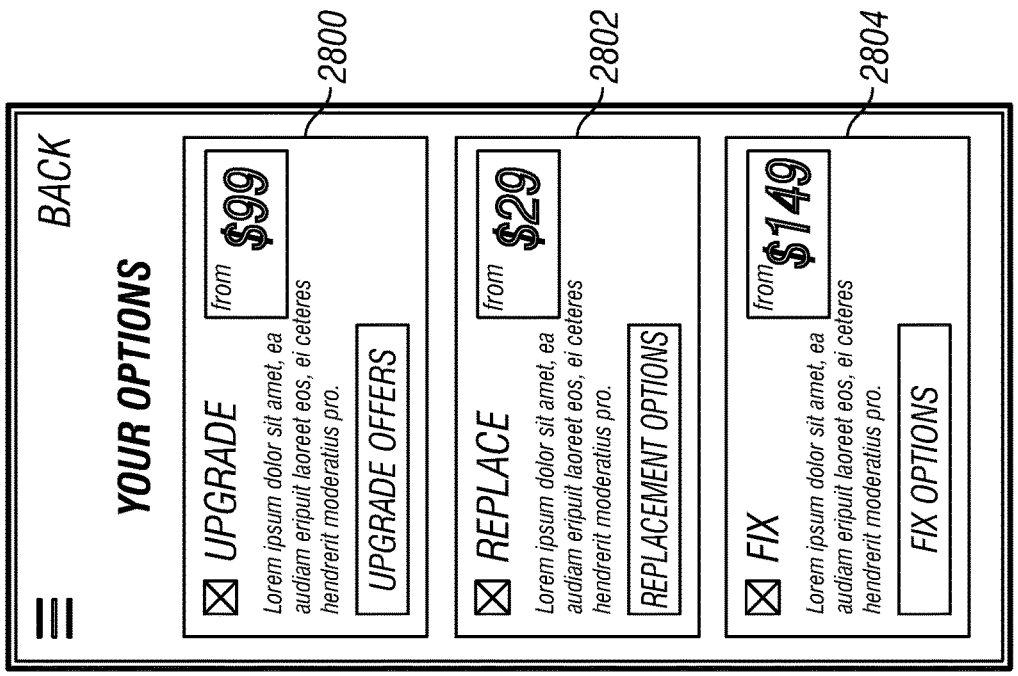
Figure 31:
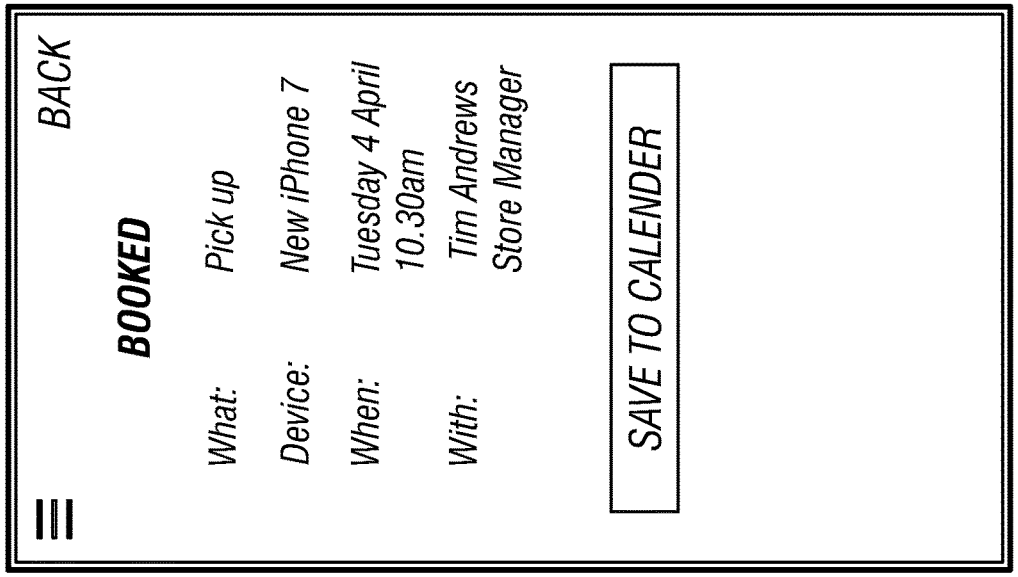
Figure 30:
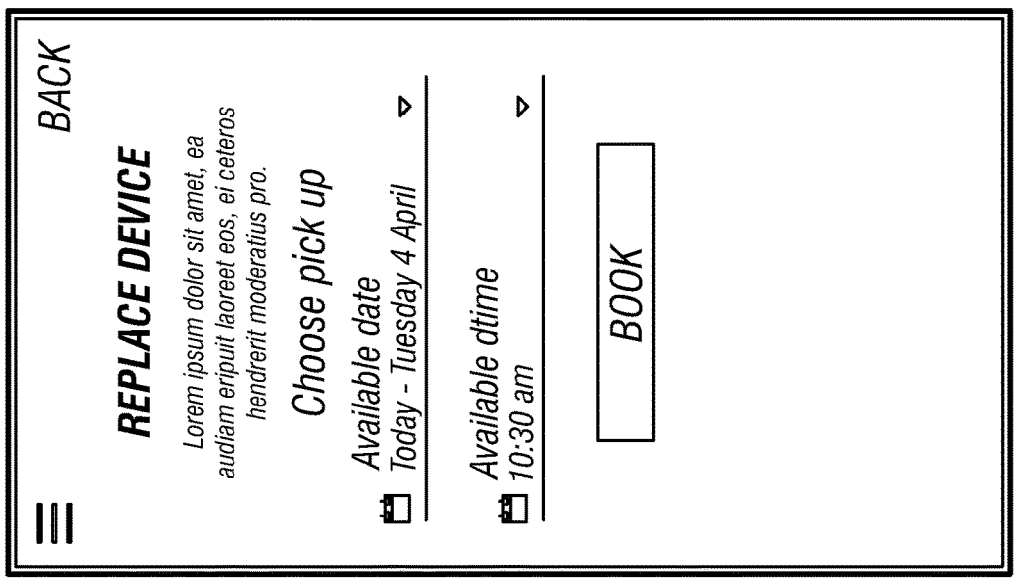

FIGS. 26-31 illustrate service options being triggered by a device fault, similar to the example with respect to FIGS. 8-17. In this example, however, the user reports a problem with the device (instead of the diagnostic app detecting a potential problem) by selecting the "Report Fault" button 806. As shown, the user interface presents the user with a plurality of potential faults, such as a battery problem 2700, a cracked screen 2702, fault 3 2704, fault 4 2706, to be reported. The user, in this example, can also select to engage with a live chat 2708 with a customer representative. In this example, the user has selected a cracked screen 2702. In response to this selection, the abstraction layer 200 communicates with multiple systems to seamlessly present the user with an integrated view of potential upgrade 2800, replacement 2802 and repair 2804 options as shown in FIG. 28. Although the abstraction layer 200 presents these options in an integrated view of the user, these service options may have been determined by communicating with multiple underlying systems, such as the financing system 306 for the upgrade offer and the device protection system 304 to determine the replacement and/or repair options. In this example, the user has selected the replacement offer 2802. In response, the user is presented with the closest store for picking up the replacement device based on location services of the mobile device. As shown in FIG. 29, the user can select from one of the closest stores or pick another store. FIGS. 30-31 illustrate user selection of a time to pick up the replacement device, and has an option to save this day/time to the user's calendar.

Figure 7:
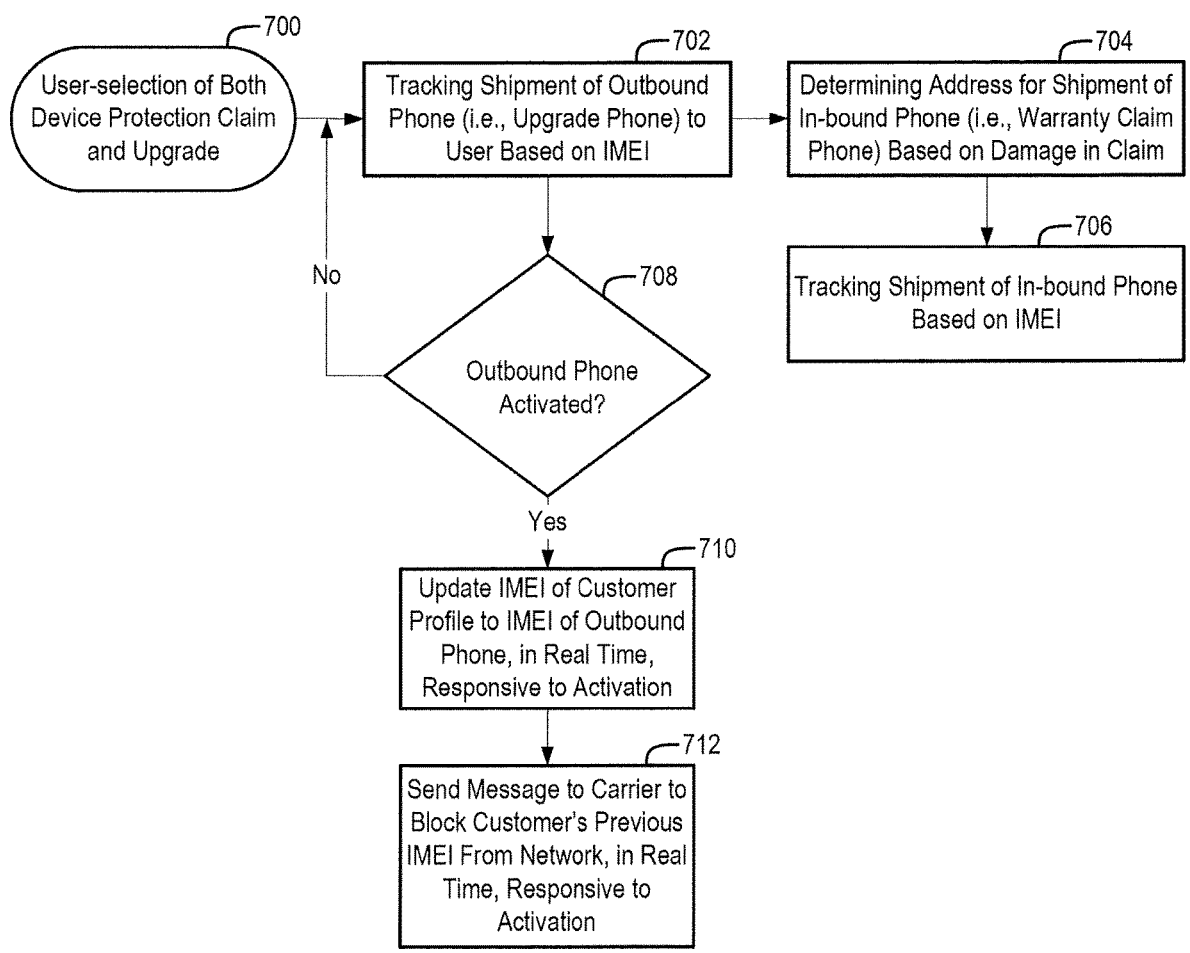
FIG. 7 is an example flow chart showing potential actions for managing a supply chain during a mobile device upgrade and a device protection claim with the system according to an embodiment of the present invention.

FIG. 7 illustrates potential actions of the system for supply chain management during adjudication of a device protection claim and upgrade. In the embodiment shown, the claim adjudication occurs simultaneously with the upgrade, which allows the user to receive the upgraded mobile device earlier than the existing lifecycle in which claim adjudication and upgrades are serial processes. There are technical obstacles that were overcome as described herein to allow the adjudication and upgrade processes to occur in parallel.

In the example shown, the process starts with the user selection of a device protection claim (or a trade in/buy back) and an upgrade (Block 700). As discussed above, the abstraction layer 200 may include a user interface that allows the user to make these selections by pulling the user profile on service options from multiple systems through APIs. Upon receiving this user selection, an outbound device (upgrade device) is shipped to the user without waiting for adjudication of the device protection claim. The abstraction layer 200 may interact with a shipping system to track the location of the outbound device based on the device's IMEI (international mobile equipment identity) number (Block 702). Additionally, the abstraction layer 200 could interact with an inventory system through an API to update inventory levels to show that the outbound device is no longer within the warehouse.

In some cases, the abstraction layer 200 may perform grading of the inbound device (protection claim device) to determine what action needs to be performed for the inbound device to be resold. Depending on what action needs to be performed, the abstraction layer could determine vary the address for shipment of the inbound mobile device (block 704). For example, if the screen on the inbound mobile device is cracked, the address given by the abstraction layer 200 could be a screen replacement facility. By way of another example, if the battery of the inbound mobile device is malfunctioning, the address could be a warehouse that includes battery replacement services. Regardless, the abstraction layer 200 could include business rules that are configured to evaluate the claim and determine the address for shipment accordingly. By having the address be determined based on the warranty claim, this speeds the process of fixing the inbound device for resale, which potentially increases the resale price of the inbound device by speeding up the process. The location of the inbound device is tracked using the IMEI number upon reaching the address determined by the abstraction layer (block 706).

The process continues at Block 708 in which the abstraction layer 200 monitors for activation of the outbound phone. In response to activation of the outbound phone, the abstraction layer 200 updates the user profile associated with the outbound phone to change the IMEI associated with the user of the outbound phone (block 710). The abstraction layer 200 can also, in real time responsive to activation of the outbound phone, message the user's carrier to block the IMEI of the previous device from the network (block 712). This aids in preventing fraud caused by a user keeping both their existing device for which a device protection claim was made and the upgraded device. By blocking the IMEI of the existing device, the user will only have a single device that functions on the network. Although the process in FIG. 7 illustrates actions that can be made responsive to event monitoring for supply chain improvements, the abstraction system 200 can be used for other event monitoring regarding a user based on business rules.

EXAMPLES

Illustrative examples of the method and system disclosed herein are provided below. An embodiment of the method and system may include any one or more, and any combination of, the examples described below.

Example 1 is a computer-implemented method for operating one or more servers to manage lifecycles of mobile computing devices. The method includes the step of detecting, by the one or more servers, a triggering event regarding a mobile computing device of a customer. In response to detecting the triggering event, the method includes determining, by the one or more servers, a customer profile with one or more service options available to the customer corresponding to the mobile computing device by integrating disparate data sources concerning the customer together using a plurality of APIs. The one or more servers provide data to a customer application executing on the mobile computing device to generate a presentation on a display of the mobile computing device, wherein the presentation includes a user interface feature from which the customer can trigger transmission of a service option request that requests one or more service options available to the customer. In response to receiving the service option request from the user interface feature, updating, by the one or more servers, the disparate data sources corresponding to the mobile computing device of the customer to reflect the one or more service options requested in the service option request.

In Example 2, the subject matter of Example 1 is further configured to such that the one or more servers detect the triggering event based on a communication from the customer application indicating detection of a hardware and/or software fault on the mobile computing device of the customer.

In Example 3, the subject matter of Example 2 is further configured to such that the one or more servers detect the triggering event based on a communication from the customer application indicating a battery malfunction on the mobile computing device of the customer.

In Example 4, the subject matter of Example 1 is further configured to such that the one or more servers detect the triggering event based on a communication from the customer application indicating selection from the user interface identifying a hardware and/or software fault of the mobile computing device of the customer.

In Example 5, the subject matter of Example 1 is further configured to such that the one or more servers detect the triggering event based on a communication from the customer application indicating selection from the user interface identifying a cracked screen on the mobile computing device of the customer.

In Example 6, the subject matter of Example 1 is further configured to such that the triggering event is initiated by the one or more servers, based on a designated time period left before a contract associated with the mobile computing device of the customer expires.

In Example 7, the subject matter of Example 1 is further configured to such that the customer profile includes financing options and device protection options available to the customer, wherein the financing options and device protection options are determined by integrating data from disparate data sources through a plurality of APIs.

In Example 8, the subject matter of Example 7 is further configured to such that the customer profile includes repayment issues of the customer and/or utilization of upgrades by the customer, wherein the repayment issues and utilization of upgrades by the customer are determined by integrating data from disparate data sources through a plurality of APIs.

In Example 9, the subject matter of Example 1 is further configured to such that the user interface feature includes a presentation of one or more of an upgrade option, a replacement option and/or a repair option based on one or more service options available to the customer in the customer profile.

In Example 10, the subject matter of Example 9 is further configured to such that in response to receiving a service option request requesting a replacement option or an upgrade option from the user interface feature, the method further comprises tracking an outbound device sent to the customer based on an IMEI number of the outbound device.

In Example 11, the subject matter of Example 10 is further configured to such that in response to receiving a service option request requesting a replacement option or an upgrade option from the user interface feature, the method further comprises tracking an inbound device sent by the customer based on an IMEI number of the inbound device.

In Example 12, the subject matter of Example 11 is further configured to such that in response to the service option request requesting the replacement option or the upgrade option the method further comprises monitoring for the IMEI number of the outbound device to activate on a cellular network of a carrier associated with the customer.

In Example 13, the subject matter of Example 12 is further configured to such that in response to detecting the IMEI number of the outbound device being activated, the method further comprising transmitting a message to the carrier of the customer's cellular network to block the inbound device from the cellular network based on the IMEI number of the inbound device.

In Example 14, the subject matter of Example 11 is further configured to include grading the inbound device based, at least in part, on the triggering event.

In Example 15, the subject matter of Example 14 is further configured to such that the grading step includes determining a destination address for shipping the inbound device based on the triggering event.

In Example 16, the subject matter of Example 11 is further configured to such that the outbound device and the inbound device are tracked simultaneously.

In Example 17, the subject matter of Example 16 is further configured to such that the outbound device is sent to the customer responsive to receiving the service option request requesting a replacement option or an upgrade option from the user interface feature prior to receiving the inbound device.

Example 18 is a real-time event management system for mobile computing devices. The system includes one or more servers configured to communicate via a plurality of APIs with a plurality of systems managing service options concerning a mobile computing device of a customer. The system also includes a mobile computing device in data communication with the one or more servers. The mobile device includes a computer program embedded in a computer readable medium comprising computer executable instructions for execution by a processor. The computer program comprises: instructions to trigger gathering of potential service options available to the customer of the mobile device, including financing and device protection options available to the customer, wherein gathering of potential service options includes integrating, by the one or more servers, a plurality of disparate data sources using the plurality of APIs; instructions to receive selection by the user of one or more service options on the mobile computing device; and instructions to update a customer profile associated with the computer based on user-selection of the one or more service options.

In Example 19, the subject matter of Example 18 is further configured to such that in response to receiving selection of a service option, the computer program further includes instructions to track an outbound device sent to the customer based on an IMEI number of the outbound device.

In Example 20, the subject matter of Example 19 is further configured to such that in response to receiving selection of a service option, the computer program further includes instructions to track an inbound device sent by the customer based on an IMEI number of the inbound device; the outbound device is sent to the customer prior to receipt of the inbound device.

Although the present disclosure has been described with reference to particular means, materials and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A computer-implemented method for operating one or more servers to manage lifecycles of mobile computing devices, the method comprising:
    detecting, by the one or more servers, a triggering event regarding a mobile computing device of a customer;
    responsive to detecting the triggering event, determining, by the one or more servers, a customer profile with (i) one or more service options available to the customer; and (ii) repayment issues of the customer and/or utilization of upgrades by the customer corresponding to the mobile computing device by integrating disparate data sources concerning the customer together using a plurality of APIs;
    providing, by the one or more servers, data to a customer application executing on the mobile computing device that includes a user interface feature executing on the mobile computing device;
    receiving, by the one or more servers, a service option request that requests one or more service options available to the customer based on one or more user-selections on the customer application; and
    in response to receiving the service option request from the customer application, updating, by the one or more servers, the disparate data sources corresponding to the mobile computing device of the customer to reflect the one or more service options requested in the service option request.

2. The computer-implemented method of claim 1, wherein the one or more servers detect the triggering event based on a communication from the customer application indicating detection of a hardware and/or software fault on the mobile computing device of the customer.

3. The computer-implemented method of claim 2, wherein the one or more servers detect the triggering event based on a communication from the customer application indicating a battery malfunction on the mobile computing device of the customer.

4. The computer-implemented method of claim 1, wherein the one or more servers detect the triggering event based on a communication from the customer application indicating selection from the customer application identifying a hardware and/or software fault of the mobile computing device of the customer.

5. The computer-implemented method of claim 1, wherein the one or more servers detect the triggering event based on a communication from the customer application identifying a cracked screen on the mobile computing device of the customer.

6. The computer-implemented method of claim 1, wherein the triggering event is initiated by the one or more servers, based on a designated time period left before a contract associated with the mobile computing device of the customer expires.

7. The computer-implemented method of claim 1, wherein the customer profile includes financing options and device protection options available to the customer, wherein the financing options and device protection options are determined by integrating data from disparate data sources through a plurality of APIs.

8. The computer-implemented method of claim 1, wherein the user interface feature includes a presentation of one or more of an upgrade option, a replacement option and/or a repair option based one or more service options available to the customer in the customer profile.

9. The computer-implemented method of claim 8, wherein in response to receiving a service option request requesting a replacement option or an upgrade option from the user interface feature, further comprising tracking an outbound device sent to the customer based on an IMEI number of the outbound device.

10. The computer-implemented method of claim 9, wherein in response to receiving a service option request requesting a replacement option or an upgrade option from the user interface feature, further comprising tracking an inbound device sent by the customer based on an IMEI number of the inbound device.

11. The computer-implemented method of claim 10, wherein in response to the service option request requesting the replacement option or the upgrade option further comprising monitoring for the IMEI number of the outbound device to activate on a cellular network of a carrier associated with the customer.

12. The computer-implemented method of claim 11, wherein in response to detecting the IMEI number of the outbound device being activated, further comprising transmitting a message to the carrier of the customer's cellular network to block the inbound device from the cellular network based on the IMEI number of the inbound device.

13. The computer-implemented method of claim 10, further comprising grading the inbound device based, at least in part, on the triggering event.

14. The computer-implemented method of claim 13, wherein the grading step includes determining a destination address for shipping the inbound device based on the triggering event.

15. The computer-implemented method of claim 10, wherein the outbound device and the inbound device are tracked simultaneously.

16. The computer-implemented method of claim 15, wherein the outbound device is sent to the customer responsive to receiving the service option request requesting a replacement option or an upgrade option from the user interface feature prior to receiving the inbound device.

17. A real-time event management system for mobile computing devices, the system comprising:
one or more servers configured to communicate via a plurality of APIs with a plurality of systems managing service options concerning mobile computing devices of a plurality of customers;
a mobile computing device of the mobile computing devices of the plurality of customers in data communication with the one or more servers, wherein the mobile device includes a computer program embedded in a computer readable medium comprising computer executable instructions for execution by a processor, the computer program comprising:
instructions to trigger gathering of potential service options available to the customer of the mobile device, including financing and device protection options available to the customer, wherein gathering of potential service options includes integrating, by the one or more servers, a plurality of disparate data sources using the plurality of APIs;
instructions to receive selection of one or more service options on the mobile computing device;
instructions to update a customer profile associated with the customer based on selection of the one or more service options on the mobile computing device; and
instructions to track an outbound device sent to the customer based on an IMEI number of the outbound device in response to receiving selection of the one or more service options.

18. The system of claim 17, wherein in response to receiving selection of the one or more service options, further comprising instructions to track an inbound device sent by the customer based on an IMEI number of the inbound device, wherein the outbound device is sent to the customer prior to receipt of the inbound device.

19. A server to manage lifecycles of mobile computing devices, the server comprising:
a processor; and
non-transitory, computer-readable storage media comprising a plurality of instructions stored thereon that, in response to being executed, cause the processor to:
detect a triggering event regarding a mobile computing device of a customer;
determine, responsive to detecting the triggering event, a customer profile with one or more service options available to the customer corresponding to the mobile computing device by integrating disparate data sources concerning the customer together using a plurality of APIs;
provide data to a customer application executing on the mobile computing device that includes a user interface feature, wherein the user interface feature includes a presentation of one or more of an upgrade option, a replacement option and/or a repair option based one or more service options available to the customer in the customer profile;
receive a service option request that requests the replacement option or the upgrade option based on one or more user-selections on the mobile computing device;
in response to receiving the service option request from the customer application, update the disparate data sources corresponding to the mobile computing device of the customer to reflect the one or more service options requested in the service option request; and
track an outbound device sent to the customer based on an IMEI number of the outbound device responsive to receiving the service option request requesting the replacement option or the upgrade option.

20. The server of claim 19, wherein in response to receiving the service option request requesting a replacement option or an upgrade option from the user interface feature, further comprising one or more instructions to track an inbound device sent by the customer based on an IMEI number of the inbound device.

21. The server of claim 20, wherein in response to the service option request requesting the replacement option or the upgrade option further comprising one or more instructions to monitor for the IMEI number of the outbound device to activate on a cellular network of a carrier associated with the customer.

22. The server of claim 21, wherein in response to detecting the IMEI number of the outbound device being activated, further comprising one or more instructions to generate a message to the carrier of the customer's cellular network to block the inbound device from the cellular network based on the IMEI number of the inbound device.

23. The server of claim 20, further comprising one or more instructions to grade the inbound device based, at least in part, on the triggering event.

24. The server of claim 23, wherein to grade the inbound device comprises determining a destination address for shipping the inbound device based on the triggering event.

25. The server of claim 20, wherein the outbound device and the inbound device are tracked simultaneously.

26. The server of claim 25, wherein the outbound device is sent to the customer responsive to receiving the service option request requesting the replacement option or the upgrade option prior to receiving the inbound device.

27. One or more non-transitory, computer-readable storage media comprising a plurality of instructions stored thereon that, in response to being executed, cause a computing device to:
detect a triggering event regarding a mobile computing device of a customer;
determine, responsive to detecting the triggering event, a customer profile with one or more service options available to the customer corresponding to the mobile computing device by integrating disparate data sources concerning the customer together using a plurality of APIs;
provide data to a customer application executing on the mobile computing device that includes a user interface feature, wherein the user interface feature includes a presentation of one or more of an upgrade option, a replacement option and/or a repair option based one or more service options available to the customer in the customer profile;
receive a service option request that requests the replacement option or the upgrade option based on one or more user-selections on the mobile computing device;

in response to receiving the service option request from the customer application, update the disparate data sources corresponding to the mobile computing device of the customer to reflect the one or more service options requested in the service option request; and track an outbound device sent to the customer based on an IMEI number of the outbound device responsive to receiving the service option request requesting the replacement option or the upgrade option.

28. The one or more non-transitory, computer-readable storage media of claim 27, wherein in response to receiving the service option request requesting a replacement option or an upgrade option from the user interface feature, further comprising one or more instructions to track an inbound device sent by the customer based on an IMEI number of the inbound device.

29. The one or more non-transitory, computer-readable storage media of claim 28, wherein in response to the service option request requesting the replacement option or the upgrade option further comprising one or more instructions to monitor for the IMEI number of the outbound device to activate on a cellular network of a carrier associated with the customer.

30. The one or more non-transitory, computer-readable storage media of claim 29, wherein in response to detecting the IMEI number of the outbound device being activated, further comprising one or more instructions to generate a message to the carrier of the customer's cellular network to block the inbound device from the cellular network based on the IMEI number of the inbound device.

31. The one or more non-transitory, computer-readable storage media of claim 30, further comprising one or more instructions to grade the inbound device based, at least in part, on the triggering event.

32. The one or more non-transitory, computer-readable storage media of claim 31, wherein to grade the inbound device comprises determining a destination address for shipping the inbound device based on the triggering event.

33. The one or more non-transitory, computer-readable storage media of claim 28, wherein the outbound device and the inbound device are tracked simultaneously.

34. The one or more non-transitory, computer-readable storage media of claim 28, wherein the outbound device is sent to the customer responsive to receiving the service option request requesting the replacement option or the upgrade option prior to receiving the inbound device.

35. The one or more non-transitory, computer-readable storage media of claim 27, further comprising one or more instructions to determine repayment issues and utilization of upgrades by the customer by integrating data from disparate data sources through a plurality of APIs.

\* \* \* \* \*